United States Patent [19]

Ichikawa et al.

[11] Patent Number: 4,457,528

[45] Date of Patent: Jul. 3, 1984

[54] WHEELCHAIR

[75] Inventors: Kiyoshi Ichikawa; Hiroshi Tatsumi, both of Tokyo; Minoru Ida, Osaka, all of Japan

[73] Assignee: Manten Co., Ltd., Osaka, Japan

[21] Appl. No.: 401,981

[22] Filed: Jul. 26, 1982

[30] Foreign Application Priority Data

Aug. 11, 1981 [JP] Japan .......................... 56-119686[U]

[51] Int. Cl.3 .............................................. B62M 1/14
[52] U.S. Cl. ....................... 280/242 WC; 297/DIG. 4
[58] Field of Search .......... 280/242 WC; 297/DIG. 4

[56] References Cited

U.S. PATENT DOCUMENTS 3,887,228 6/1975 Ingerson .................... 280/242 WC
4,098,521 7/1978 Ferguson et al. .......... 280/242 WC
4,199,036 4/1980 Wereb ........................ 280/242 WC
4,362,311 12/1982 Bergman .................... 280/242 WC

*Primary Examiner*—Joseph F. Peters, Jr.
*Assistant Examiner*—Kenneth R. Rice
*Attorney, Agent, or Firm*—Wenderoth, Lind & Ponack

[57] ABSTRACT

An improved wheelchair which can pass through a narrow aisle, for example in an airplane. The wheelchair has an axle with a pair of main wheels, removably mounted to the wheelchair frame so as to be removable without lifting the frame, as well as auxiliary wheels narrow enough to pass through such an aisle. The main wheels are sufficiently spaced for stable travelling.

3 Claims, 4 Drawing Figures

WHEELCHAIR

BACKGROUND OF THE INVENTION

The present invention relates to an improvement in a wheelchair.

A conventional wheelchair has a large wheel track of about 620 mm. Therefore, it cannot pass through a narrow aisle e.g. in an airplane. A handicapped person in such a wheelchair has to be taken on or off board on a helper's back.

An object of the present invention is to provide a wheelchair which can pass through a narrow aisle in an airplane and has the required stability for travelling.

In accordance with the present invention, the width of the frame and that between the auxiliary wheels are narrow enough to pass through such an aisle and the main wheels having a large track for stability are removably mounted.

Other features and advantages of the present invention will become apparent from the following description taken with reference to the accompanying drawings.

DETAILED DESCRIPTION OF THE INVENTION

Figure 1:
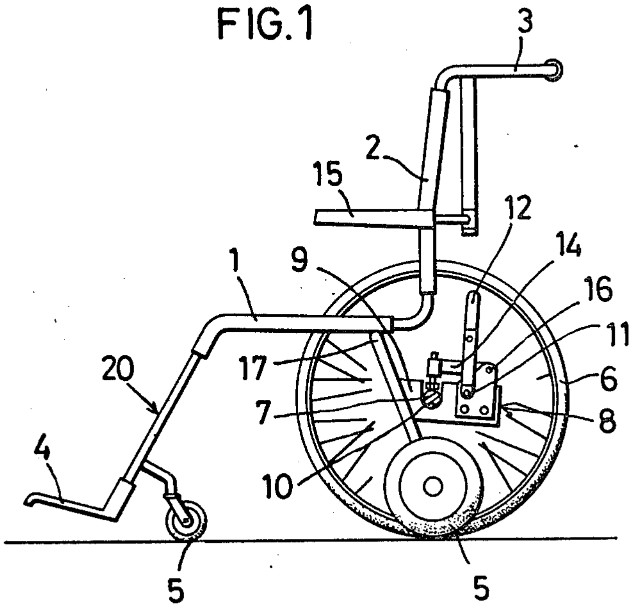
FIG. 1 is a side view of a wheelchair embodying the present invention.
Figure 2:
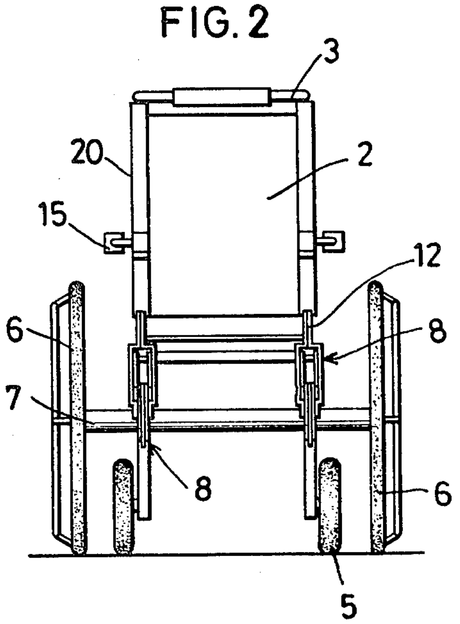
FIG. 2 is a rear view of the same.
Figure 3:
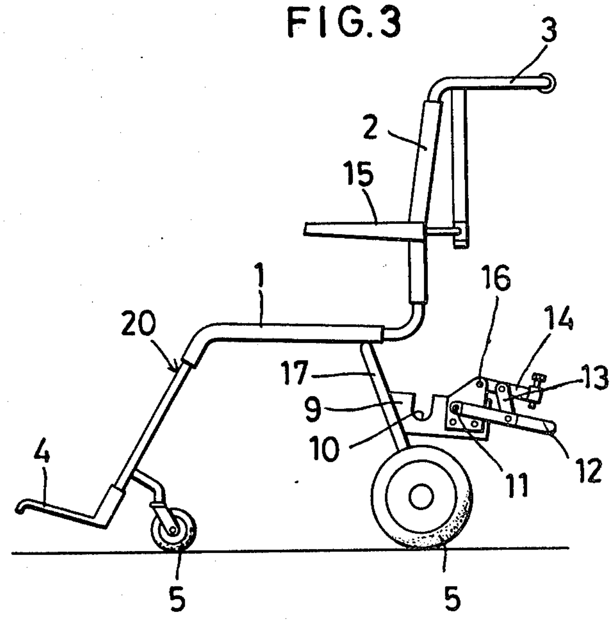
FIG. 3 is a side view of the same but with the axle and the main wheels removed.

Referring to the drawings, a frame generally designated by numeral 20 has a sufficiently small width to pass through a narrow aisle in airplanes or trains. It includes a seat 1, a back 2, a handle 3 extending backwardly from the top of the back, legs 17, and a footrest 4.

On both sides and at the front and rear of the frame are mounted auxiliary wheels 5, the track of which is slightly narrower than aisles in airplanes or trains. A main wheel 6 is mounted at each side of an axle 7. The track or width between the main wheels 6 is sufficient for stable travelling. The axle 7 is removably supported on the frame 20 by means of a mounting 8 either with both the auxiliary wheels 5 and the main wheels 6 on the ground or with the rear auxiliary wheels 5 slightly away from the ground.

In the preferred embodiment, the mounting 8 comprises a pair of projecting pieces 9 extending rearwardly from the legs 17 of the frame 20, said pieces being formed with a notch 10 to receive the axle 7 therein. A lever 12 is pivotally mounted to the projecting piece 9 around a pin 11. A presser plate 14 has its end pivotally mounted to the projecting piece 9 around a pin 16. The lever 12 and the presser plate 14 are coupled together through a link 13. When the lever 12 is pulled up, the presser plate 14 turns counterclockwise so that the axle 7 will be held down by the tip of the presser plate 14 in the notch 10 in the projecting piece 9.

Figure 4:
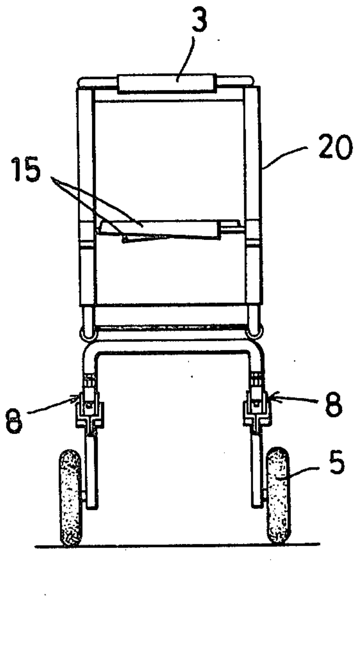
FIG. 4 is a rear view of the wheelchair shown in FIG. 3.

An armrest 15 is mounted on the frame 20 at each side so as to be collapsible to the rear of the back 2 to ensure smooth passage through a narrow aisle, as shown in FIG. 4.

In use, when the wheelchair has to be passed through a narrow aisle in airplanes or trains, the axle 7 with the main wheels 6 is removed from the frame 20 by operating the lever 12. When travelling in wider passages than aisles between the seats, the axle with the main wheels is mounted by means of the mounting 8.

The wheelchair in accordance with the present invention eliminates the need to carry a handicapped person on a person's back into or out of an airplane, for example.

What is claimed is:

1. A wheelchair comprising:

a frame having a seat, a back, and legs and being sufficiently narrow in width to pass through an aisle in an airplane or a train;

a pair of auxiliary wheels fixedly mounted on said legs of said frame at each side thereof and having a track narrow enough to pass through the aisle of the airplane or train;

an axle;

a pair of main wheels attached to each end of said axle with a track of sufficient width for stable travelling; and means for removably mounting said axle and said main wheels on said frame and demounting said axle and said main wheels from said frame when said main wheels are on a supporting surface, without raising said frame relative to the supporting surface.

2. A wheelchair as in claim 1, wherein said mounting and demounting means includes two axle supporting members, respective ones thereof extending rearwardly from each of said legs, each of said members having an upwardly facing notch for receiving said axle therein; and means for releasably securing said axle in said notches.

3. A wheelchair as in claim 2, wherein said releasably securing means includes two levers, respective ones thereof being pivotally mounted to each of said axle supporting members, presser plates, respective ones thereof being pivotally mounted to each of said members, and two links, respective ones thereof being pivotally mounted at opposite ends thereof to one each of said presser plates and said levers on each of said members such that said levers are pivotable between a first position at which said presser plates are disposed above said notches and support said frame on said axle when said axle is in said notches, and a second position at which said presser plates are displaced from said notches so that said axle may be lifted from said notches.

* * * * *